3,775,401
α-ARYL-SUCCINIMIDE-SULPHONAMIDE
DERIVATIVES
Rolf Wilhelm Pfirrmann, Lucerne, Switzerland, assignor to Ed. Geistlich Sohne A.G. fur Chemische Industrie, Lucerne, Switzerland
No Drawing. Continuation of abandoned application Ser. No. 692,635, Dec. 22, 1967. This application Aug. 4, 1971, Ser. No. 169,063
Claims priority, application Great Britain, Dec. 23, 1966, 57,731/66
Int. Cl. A61k 27/00; C07d 27/10
U.S. Cl. 260—239.6
13 Claims

ABSTRACT OF THE DISCLOSURE

Compounds of the general formula

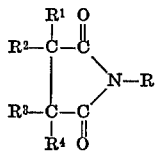

where R represents an aryl or araliphatic group substituted in the aromatic ring with at least one sulphonamido group, the nitrogen atom of which may be joined to a further ring substituent to form a —CO—NHSO$_2$- chain, and $R^1$, $R^2$, $R^3$ and $R^4$ are each H, alkyl of 1–5 carbon atoms or an aryl group, at least one of $R^1$, $R^2$, $R^3$ and $R^4$ being an aryl group and physiologically acceptable salts thereof with bases. The compounds are useful in the treatment of epilepsy.

---

This application is a continuation of Ser. No. 692,635, filed Dec. 22, 1967 and now abandoned.

This invention relates to novel compounds of use in the treatment of epilepsy and to processes for their preparation.

The compound α-ethyl-α-methyl-succinimide has been shown to be effective against the petit mal form of epilepsy but it is far less effective against the grand mal form and its effective dose level then approaches the toxic dose level.

In copending U.S. application No. 578,462, filed Sept. 12, 1966, and now abandoned in favor of a continuing application No. 73,741, filed Nov. 26, 1969, now U.S. Pat. No. 3,574,194, patented Apr. 6, 1971, there are described certain α-alkyl-succinimido-sulphonamide derivatives which are more physiologically compatible and possess an excellent ratio of anticonvulsant activity to unwanted side effects. We have now found that if the compounds of said copending application No. 578,462 possess at least one aryl group in the succinimido portion, their physiological effects are at least of the same order as those of the corresponding non-aryl compounds and in some instances possess even lower toxicity.

According to the present invention we provide compounds of the general formula

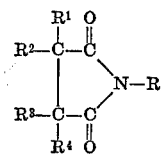
(I)

(where R represents an aryl or araliphatic group substituted in the aromatic ring with at least one sulphonamido group, the nitrogen atom of which may if desired by joined to a further ring substituent; and ($R^1$, $R^2$, $R^3$ and $R^4$, which may be the same or different, are hydrogen atoms, alkyl groups having 1–5 carbon atoms or aryl groups, at least one of the substituents $R^1$, $R^2$, $R^3$ and $R^4$ being an aryl group) and their salts with bases.

These compounds possess particularly favorable pharmacological properties as hereinafter set forth including strong anti-convulsant activity and particularly good compatibility. They also exhibit diuretic activity due to possession of a sulphonamido group.

R may, for example be a phenyl group which in addition to a sulphonamido group, may carry one or more such substituents as aliphatic hydrocarbon groups, e.g. lower alkyl groups for example methyl, ethyl or propyl groups, ether groups such as alkoxy groups having 1–5 carbon atoms, for example methoxy or ethoxy groups, hydroxy groups, acylamido groups, such as formamido, acetamido or diacetamido groups, nitro groups, amino groups, carboxyl groups, acyl groups such as acetyl or benzoyl groups, or halogen atoms.

Those compounds are particularly preferred in which R is a group of the formula

(II)

where $R^5$ represents one or more hydrogen or halogen atoms, e.g. fluorine, chlorine or bromine atoms, or aliphatic hydrocarbon, ether, hydroxy or acylamino groups and $R^6$ and $R^7$ which may be the same or different, are hydrogen atoms, heterocyclic groups such as pyridyl, pyrimidyl or imidazolyl groups or aliphatic hydrocarbon groups which may, if desired, carry substituents such as oxo, hydroxyl, carboxyl or esterified carboxyl, or amino or alkylamino groups, or together with the nitrgen atom to which they are attached, form a heterocyclic group, e.g. a piperidyl or piperazyl group.

$R^5$ can also advantageously together with $NR^6R^7$ form a —CO—NH—SO$_2$— chain.

$R^6$ and $R^7$ may, for example, be alkyl groups having 1–5 carbon atoms, i.e. methyl, ethyl, propyl, butyl or amyl groups, acyl groups such as acetyl or benzoyl groups, carbamyl groups, e.g. the n-butylamino-carbonyl group, hydroxyalkyl groups, e.g. β-hydroxyethyl, or esterified carboxyalkyl groups e.g. ethoxycarbonyl-ethyl groups. The preferred compounds, however, are those in which $R^6$ and $R^7$ are both hydrogen. The sulphonamido group is preferably in the 4-position relative to the succinimido group.

As indicated above, at least one of the substituents $R^1$, $R^2$, $R^3$ and $R^4$ is an aryl group, that is an aromatic hydrocarbon group which may be unsubstituted or may carry one or more substituents, for example alkoxy, methylenedioxy, nitro, cyano, acyl, carboxyl, esterified carboxyl, amino, alkylamino, sulphonamido or acylamido groups or halogen atoms. The aromatic hydrocarbon group may be polynuclear or, more preferably, mononuclear, and the nucleus may carry one or more alkyl, alkenyl or aralkyl groups. Alkoxy, alkyl, alkenyl, aralkyl or esterified carboxyl groups preferably contain 1–5 carbon atoms in the aliphatic portion thereof. Thus, at least one of $R^1$, $R^2$, $R^3$ and $R^4$ may be a phenyl, chlorophenyl, fluorophenyl methoxyphenyl, nitrophenyl, aminophenyl or acylamidophenyl group.

One especially useful compound according to the invention is

1-N-(α-methyl-α-phenyl-succinimido)-4-sulphonamido-benzene.

Other compounds of interest include

1-N-(α-(p-chlorophenyl)-α-methyl-succinimido)-4-sulphonamido-benzene

1-N-(α-(p-fluorophenyl)-α-methyl-succinimido)-4-sulphonamido-benzene
1-N-(α-(p-methoxyphenyl)-α-methyl-succinimido)-4-sulphonamido-benzene
1-N-α-phenyl-succinimido-4-sulphonamido-benzene
1-N-(α-phenyl-α-butyl-succinimido)-4-sulphonamido-benzene
1-N-(α,α-diphenyl-succinimido)-4-sulphonamido-benzene
1-N-(α-(p-nitrophenyl)-α-methyl-succinimido)-4-sulphoamido-benzene and
1-N-(α-phenyl-α-ethyl-succinimido)-4-sulphonamido-benzene.

1-N-(α-methyl-α - phenyl - succinimido) - 4 - sulphonamido-benzene has shown excellent anti-convulsant activity in electro-shock tests on mice and rats while its LD$_{50}$ value appears to be at least 5000 mg./kg. Some sedative activity can be observed. The corresponding α-ethyl compound possesses a measurable toxicity but this is still very low, the LD$_{50}$ value being of the order of 3000 mg./kg., while its anti-convulsant activity is of the same order as that of the methyl compound. In general, the aryl-substituted succinimido compounds according to the invention show prolonged duration of action as compared with the corresponding alkyl-succinimido derivatives.

Being sulphonamides, the new compounds form salts with bases, for example alkali metal salts, e.g. sodium salts or salts with ammonia or amines.

According to a further feature of the invention we provide pharmaceutical compositions containing one or more compounds according to the invention together with one or more pharmaceutical carriers or excipients.

Thus, for example, the compositions may take the form of tablets, dragees, capsules, lozenges, suppositories, ampoules for injection, solutions, etc.

The carriers or excipients in such compositions may, for example be those conventional for such forms and may include starch, lactose, magnesium stearate, talc, gelatin, sterile water, or suspending, emulsifying dispersing, thickening or flavouring agents.

Dosage units forms such as tablets, capsules, suppositories or ampoules are preferred and advantageously each unit contains 10 to 1000 mg. of active substances, preferably 100 to 300 mg.

The compositions, preferably contain the active substance at a concentration between 0.10 and 80.0% by weight.

According to a still further feature of the invention we provide a process for the preparation of compounds of the General Formula I as defined above wherein a compound of the general formula

$$RNH_2 \qquad (III)$$

is reacted with a succinic acid derivative of the general formula

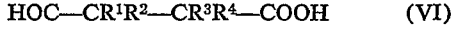

$$HOC—CR^1R^2—CR^3R^4—COOH \qquad (VI)$$

or a reactive derivative thereof, where R$^1$, R$^2$, R$^3$, R$^4$ and R have the meanings given above, to form the desired succinimido derivative.

The reaction may be effected in a single stage, or in two stages. In the latter case, the initial product will have the general formula

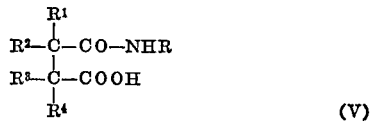

(or its isomer in which the hemisuccinyl group is attached by the carboyl adjacent to the groups R$^3$ and R$^4$) and may be isolated, if desired, before final cyclisation. In general the final condensation requires a reaction temperature of the order of 200° C. and for single stage condensations the reaction should be carried out at this order of temperature. The half-condensation of the succinic acid of Formula IV generally takes place within the range 80°–100° C.

Similarly, the initial condensation to form the product of Formula V is readily effected by merely heating in an inert solvent, e.g. a hydrocarbon, nitro-hydrocarbon, chloro-hydrocarbon, ether or cyclic ether solvent. The second stage to effect cyclisation may be effected, for example, in the presence of a dehydrating agent such as an anhydrous salt, e.g. sodium acetate or sulphuric, phosphoric or polyphosphoric acid or phosphorus pentoxide or simply by heating to about 200° C. in the absence of a solvent with or without a vacuum.

The reaction time for the reaction with the free acid is preferably 1–5 hours, advantageously about 2 hours. The one-stage reaction with the anhydride is preferably effected at about 200° C. for a short time.

According to a modification of the reaction the amine RNH$_2$ may carry substituents capable of conversion to the desired substituents in R after cyclisation. Thus, for example, 6-amino-saccharin may be reacted with the acid of Formula IV or its anhydride to give a compound in which R carries adjacent sulphonamide and carboxyl groups, the cyclic amide ring having been split during the reaction. A nitro group initially in the group R may be reduced by catalytic hydrogenation, to an amino group which may itself be alkylated or acylated by reaction with an alkylating or acylating reagent.

The sulphonamido compounds according to the invention may also be prepared from corresponding compounds lacking a sulphonamido group by reaction with reagents for introducing a sulphonamido group. Thus, for example, a compound of Formula I in which R represents an aryl or araliphatic group having no sulphonamido group may be reacted with a sulphonyl halide, to form a halosulphonyl derivative which may then be reacted with ammonia or an amine of the formula NH—R$^6$R$^7$, where R$^6$ and R$^7$ have the above meanings. It is also possible to introduce an amino group by nitration and reduction and to convert this to sulphonyl halide by diazotisation and treatment with sulphur dioxide in the presence of cuprous halide. Such reactions may introduce sulphonamido groups into the aryl ring in the α- or β-position of the succinamido group, particularly where an excess of the sulphonylating reagent is used. Similarly, a compound of Formula I in which R is a phenyl group carrying a free amino group may be prepared by the reaction of the corresponding amino-benzene derivative with the acid of Formula III or a reactive derivative thereof; if necessary the amino group may be protected before reaction.

The compounds of Formula I in which R has Formula II wherein one or both of R$^6$ and R$^7$ are hydrogen can be used to prepare derivatives thereof. Thus, for example, acylation gives the acyl derivative e.g. by reaction with an acyl halide or anhydride; alkylation gives the alkyl derivatives, e.g. by reaction with an alkyl halide, sulphate, sulphonate etc. Hydroxyalkylation gives the hydroxyalkyl derivative, e.g. by reaction with ethylene oxide; carbamylation gives the corresponding urethane, e.g. by reaction with a carbonyl dihalide followed by reaction with ammonia or an amine.

In order that the invention may be well understood we give the following examples by way of illustration only:

EXAMPLE 1

1-N-(α-phenyl-α-methyl-succinimido)-4-sulphonamido-benzene

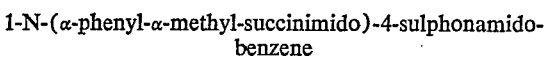

17.2 g. sulphanilamide and
20.8 g. α-phenyl-α-methyl-succinic acid are heated together to 200° C. and held at this temperature for 30 minutes. Then ethyl acetate is added and the reaction product precipitated with petrol ether and dried to yield:

24.8 g. reddish crystals which are recrystallised from dioxan to yield:

white crystals of m. pt. 203–205° C.

Analysis.—Calc. (percent): C, 59.35; H, 4.69; N, 8.14. Found (percent): C, 59.40; H, 4.77; N, 8.03.

EXAMPLE 2

1-N-(α-phenyl-α-ethyl-succinamido)-4-sulphonamido-benzene 7.6 g. α-phenyl-α-ethyl-succinic acid and
6.2 g. sulphanilamide are heated together to 190° C. and held at that temperature for 15 minutes. The mixture is then taken up in ethyl acetate and filtered over activated charcoal. Petrol ether is added to the filtrate, which is cooled and the precipitate filtered with suction to yield:

8.0 g. of a white product which on recrystallisation from ethylacetate/petrol ether, yields:

white crystals of m. pt. 141–143° C.

Analysis.—Calc. (percent): C, 60.39; H, 5.07; N, 7.83. Found (percent): H, 4.98; N, 7.50.

EXAMPLE 3

1-N-(p-methoxyphenyl-α-methyl-succinimido)-4-sulphonamido-benzene 46.0 g. α-methyl-α-(p-methoxyphenyl)-succinic acid and
33.5 g. sulphanilamide are heated together for 15 minutes at 160–170° C. and then at 180–190° for a further 15 minutes. Ethyl acetate is then liberally poured into the melt while it is still at 60° C. After filtration, petrol ether is added to the filtrate and filtration with suction yields:

68.5 g. beige crystals.

The product is dissolved in ethyl acetate, treated with activated charcoal and filtered. Petrol ether is added to the filtrate and the precipitate filtered with suction to yield:

46.0 g. white crystals of m. pt. 172–185° C.

About 10 g. of this product was recrystallised from ethyl acetate/petrol ether to yield:

6 g. white crystals of m. pt. 174–178° C.

For analysis, a sample was recrystallised 3 times from ethyl acetate/petrol ether to yield:

white crystals of m. pt. 175–179° C.

Analysis.—Calc. (percent): C, 57.80; H, 4.85; N, 7.49. Found (percent): C, 57.92; H, 4.83; N, 7.36.

EXAMPLE 4

1-N-(α-p-chlorophenyl-α-methyl-succinimido)-4-sulphonamido-benzene 22.2 g. of α-methyl-α-p-chlorophenyl-succinic acid and
15.7 g. of sulphanilamide are heated together for 30 minutes at 180–200° C. After cooling the mixture is taken up in ethyl acetate and filtered off from a small amount of insoluble material. The filtrate is cooled and filtration with suction yields 27.6 g. of a light-brown product of m. pt. 193–200° C.

A sample is recrystallised from ethyl acetate/petroleum ether to yield white crystals of m. pt. 208–212° C.

Analysis.—Calc. (percent): C, 50.01; H, 4.00; N, 7.41; Cl, 9.38. Found (percent): C, 53.90; H, 4.03; N, 7.45; Cl, 9.30.

EXAMPLE 5

1-N-α-phenylsuccinimido-4-sulphonamido-benzene 11 g. of α-phenyl-succinic acid and
10.4 g. of sulphanilamide are heated together for 25 minutes at 180° C. The oxide product, crystallising on cooling, is then dissolved in acetone and filtered off. Petroleum ether is added to the filtrate which is cooled and on filtration by suction yields 12.4 g. of white crystals of m. pt. 215–217° C.

A sample recrystallised from acetone/petroleum ether yields white crystals of m. pt. 215–217° C.

Analysis.—Calc. (percent): C, 58.28; H, 4.28; N, 8.49. Found (percent): C, 58.21; H, 4.29; N, 8.44.

EXAMPLE 6

1-N-(α-(p-sulphonamido)-phenyl-α-methyl-succinimido)-4-sulphonamido-benzene 3.0 g. (0.0087 mol) of α-phenyl-α-methyl-succinimido-4-sulphonamido-benzene are mixed with 9.0 g. (0.77 mol) of chlorosulphonic acid and heated for 5 minutes to 120° C. Ice is added to the crude reaction product and the precipitate formed is filtered with suction. Concentrated ammonia is poured in excess over the filter residue which is then gently heated on a water bath. A clear solution is formed which is acidified with conc. HCl with cooling, and the resulting precipitate is filtered with suction.

Yield: 1.2 g. of a white substance.

A sample thereof is recrystallised from hot water; m. pt. 140–143° C. Mixed melting point with the substance according to Example 8: 140–142° C. By chromatography over aluminum oxide and elution with benzene/methanol (1:1), colourless crystals are obtained which after recrystallisation from ethyl acetate/petroleum ether melt at 225–227° C. The product of the present example is identical with that of Example 7 according to the IR-spectrum and thin layer chromatogram.

EXAMPLE 7

1-N-(α-p-sulphonamido-phenyl-α-methyl-succinimido)-4-sulphonamido-benzene 2.0 g. (0.0075 mol) of a α-phenyl-α-methyl-succinimido-benzene are mixed with 6.0 g. (0.005 mol) of chlorosulphonic acid and heated for 5 minutes to 120° C. Ice is added to the crude reaction product and the precipitate formed filtered with suction. Conc. ammonia is poured in excess over the filter residue which is then gently heated on a water bath. A resinous lump is formed which, after recrystallisation from hot water, yields 0.7 g. of white crystals of m. pt. 140–143° C.

Analysis.—Calc. (percent): C, 48.2; H, 4.05; N, 9.92; S, 15.14. Found (percent): C, 48.02; H, 4.00; N, 10.01; S, 15.09.

EXAMPLE 8

1-N-(α-p-nitrophenyl-α-methyl-succinimido)-4-sulphonamido-benzene 7.4 g. of sulphanilamide (1 mol) and
11.2 g. of α-p-nitrophenyl-α-methyl-succinic acid are heated under a nitrogen atmosphere in an open flask to 180° C. and held at this temperature for 15 minutes. Ethyl acetate is then liberally poured into the melt and the solution is then allowed to cool; the precipitate is then filtered with suction to yield 4.6 g. of brown-red crystals of m. pt. 222–223° C.

The crystalline product is thoroughly triturated with 2H—HCl, filtered with suction and dried. The residue is dissolved in tetrahydrofuran, filtered over activated charcoal and a large amount of ether added.

Filtration with suction of the precipitate yields 230–233° C.

*Analysis.*—Calc. (percent): C, 52.49; H, 3.89; N, 10.80. Found (percent): C, 52.41; H, 3.98.

EXAMPLE 9

1-N-(α-phenyl-α-methyl-β-n-butyl-succinimido)-4-sulphonamido-benzene 0.5 g. of α-phenyl-α-methyl-β-n-butyl-succinic acid and
0.3 g. of sulphanilamide are heated together at 180° C. and kept at this temperature for 10 minutes. The whole reaction mixture is then taken up with ethyl acetate, filtered over charcoal, whereupon petroleum ether is added. The resulting precipitate is filtered with suction, to yield 0.4 g. of reddish crystals of m. pt. 100–100° C.

After recrystallising from ethyl acetate/petroleum ether, white crystals of m. pt. 153–158° C. are obtained.

*Analysis.*—Calc. for $C_{21}H_{24}N_2O_4S$ (percent): C, 63.05; H, 5.29; N, 7.00. Found (percent): C, 63.17; H, 5.45; N, 6.95.

EXAMPLE 10

1-N-(α,α-diphenyl-succinicimido)-4-sulphonamido-benzene 1.6 g. of α-diphenylsuccinic acid and
1.0 g. of sulphanilamide (1 mol)

are heated together under an atmosphere of nitrogen in an open vessel at 210° C. and kept at this temperature for 15 minutes. Ethyl acetate is added to the still warm reaction mixture, whereupon the product crystallises immediately.

The whole intermediate product is dissolved in hot ethyl acetate, filtered off and petroleum ether added to the filtrate which is then cooled; the resulting precipitate being filtered with suction, to yield 1.8 g. of beige crystals of m. pt. 220–223° C.

Recrystallised from tetrahydrofuran/ether, yield white crystals of m. pt. 220–222° C. are obtained.

*Analysis.*—Calculated for $C_{22}H_{18}N_2O_4S$ (percent): C, 65.99; H, 4.37; N, 6.69. Found (percent): C, 65.93; H, 4.16; N, 6.63.

EXAMPLE 11

1-N-α-(p-fluorophenyl)-α-methyl-succinimido)-4-sulphonamido-benzene 2.2 g. of α-(p-fluorophenyl)-α-methyl-succinic acid and
1.7 g. of sulphanilamide (1 mol)

are heated together under an atmosphere of nitrogen at 190° C. and kept at this temperature for 10 minutes. The reaction mixture is then taken up with etheyl acetate and cooled, and the resulting precipitate filtered with suction and dried, to yield 2.5 g. of white crystals of m. pt. 213–218° C.

After recrystallisation from tetrahydrofuran/petroleum ether, white crystals of m. pt. 213–219° C. are obtained.

*Analysis.*—Calc. for $C_{17}H_{15}N_2O_4S$ (percent): C, 56.40; H, 4.18; N, 7.74. Found (percent): C, 56.26; H, 4.25; N, 7.65.

EXAMPLE 12

1-N-(α-phenyl-α-n-butyl-succinimido)-4-sulphonamido-benzene 3.1 g. of α-butyl-α-phenyl-succinic acid and
2.2 g. of sulphanilamide (1 mol)

are heated together under an atmosphere of nitrogen at 200° C. and left at this temperature for 10 minutes. The whole reaction mixture is dissolved in ethyl acetate and cooled after addition of petroleum ether. The resulting precipitate is filtered with suction, thus yielding 4.1 g. of white crystals of m. pt. 122–132° C.

After recrystallisation from alcohol/water, white crystals of m. pt. 152–154° C. are obtained.

*Analysis.*—Calc. for $C_{20}H_{22}N_2O_4S$ (percent): C, 62.17; H, 5.74; N, 7.27. Found (percent): C, 62.28; H, 5.65; N, 7.11.

EXAMPLE 13

1-N-(α-p-aminophenyl-α-methyl-succinimido)-4-sulphonamido-benzene 10. 5 g. of 1-N-(α-p-nitrophenyl)-α-methyl-succinimido-4-sulphonamido-benzene are dissolved in 2.50 ml. of tetrahydrofuran and 3 spatula tips (10 mg.) of $PtO_2$ are added, followed by hydrogenation.

Take-up of $H_2$

Theory _____l__ 2.0
Practice _____l__ 2.3
Duration _____hours__ 24

The dark solution is filtered off from the catalyst and totally evaporated to dryness in vacuo. 8.1 g. of light-brown crystals of m. pt. 205–209° C. are obtained which, after recrystallisation from water/alcohol, yield light-yellow crystals of m. pt. 241–242° C.

*Analysis.*—Calc. for $C_{17}H_{17}N_3O_4S$ (percent): C, 56.87; H, 4.77; N, 11.71. Found (percent): C, 56.80; H, 4.87; N, 11.51.

EXAMPLE 14

1-N-(α-p-acetamido-phenyl-α-methyl-succinimido)-4-sulphonamido-benzene 0.5 g. of 1-N-(α-p-aminophenyl-α-methyl-succinylimido)-4-sulphamido-benzene and
10 ml. of acetic acid anhydride are heated together until a clear solution is formed. After cooling, ether is added and the precipitate thoroughly cooled and then filtered with suction.

450 mg. of biege crystals of m. pt. 218–221° C.

are obtained which, after recrystallisation from acetone/petroleum ether, yield white crystals of m. pt. 228–231° C.

*Analysis.*—Calculated for $C_{19}H_{19}N_3O_5S$ (percent): C, 56.85; H, 4.77; N, 10.47. Found (percent): C, 56.77; H, 4.84; N, 10.43.

EXAMPLE 15

1-N-(α-phenyl-α,β-dimethyl-succinimido)-4-sulphonamido-benzene 5.0 g. of α-phenyl-α,β-dimethyl-succinic acid and
3.9 g. of sulphanilamide are heated together at 180° C. and kept at this temperature for 15 minutes. The whole reaction mixture is taken up with ethyl acetate and allowed to stand overnight.

After filtering the resulting precipitate with suction, 5.2 g. of reddish crystals of m. pt. 180–188° C.

are obtained. Recrystallised from acetone/petroleum ether, white crystals of m. pt. 182–190° C. are obtained.

*Analysis.*—Calc. for $C_{18}H_{18}N_2O_4S$ (percent): C, 60.32; H, 5.06; N, 7.82. Found (percent): C, 60.18; H, 4.83; N, 7.96.

EXAMPLE 16

1-N-(α-phenyl-α-methyl-succinimido)-3-sulphonamido-benzene 4.0 g. of phenyl-α-methyl-succinic anhydride and
4.0 g. of m-sulfanilamide are heated together for 20 minutes at 210° C. Subsequently, while still hot, the product is dissolved in alcohol and then allowed to stand at room temperature. The precipitated mass of crystals is treated with diethylether and filtered with suction. Recrystallisation from alcohol yields white crystals of m. pt. 177–179° C. Recrystallisation from petroleum ether yields white crystals of m. pt. 180–182° C.

*Analysis.*—Calculated for $C_{17}H_{16}N_2O_4S$ (percent): C, 59.35; H, 4.69; N, 8.14. Found (percent): C, 59.25; H, 4.76; N, 8.09.

I claim:
1. A compound selected from the group consisting of a compound of the formula

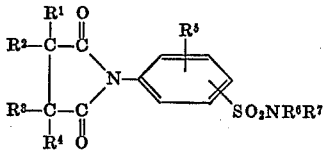

wherein $R^1$, $R^2$, $R^3$ and $R^4$ are each H, alkyl of 1–5 carbon atoms, phenyl or phenyl substituted by at least one of alkyl of 1–5 carbon atoms, alkenyl of up to 5 carbon atoms, alkoxy of 1–5 carbon atoms, methylenedioxy, nitro, cyano, carboxyl, amino, alkylamino wherein the alkyl radical is of 1–5 carbon atoms, sulphonamido, acetamido or halo, at least one of $R^1$, $R^2$, $R^3$ and $R^4$ being said phenyl or substituted phenyl, $R^5$ is at least one of H, halo or hydroxy and $R^6$ and $R^7$ are each H, pyrimidyl, alkyl of 1–5 carbon atoms, acetyl, β-hydroxyethyl, n-butylcarbamyl or ethoxycarbonyl ethyl or $R^6$ and $R^7$ together with the nitrogen atom to which they are attached are piperidyl or piperazyl; and pharmaceutically acceptable salts of said compound with bases.

2. A compound as defined in claim 1 in which $R^6$ and $R^7$ are each H.

3. A compound as claimed in claim 1 in which at least one of $R^1$, $R^2$, $R^3$ and $R^4$ is phenyl, chlorophenyl, fluorophenyl, methoxyphenyl, nitrophenyl, aminophenyl or acetamidophenyl.

4. A compound as claimed in claim 3 in which $R^6$ and $R^7$ are each H.

5. The compound of claim 1 which is 1-N-(α-methyl-α-phenyl-succinimido)-4-sulphonamido-benzene.

6. The compound of claim 1 which is 1-N-[α-(p-chlorophenyl)-α-methyl-succinimido]-4-sulphonamido-benzene.

7. The compound of claim 1 which is 1-N-[α-(p-fluorophenyl)-α-methyl-succinimido)-4-sulphonamido-benzene.

8. The compound of claim 1 which is 1-N-[α-(p-methoxyphenyl) - α - methyl - succinimido]-4-sulphonamido-benzene.

9. The compound of claim 1 which is 1-N-α-phenyl-succinimido-4-sulphonamido-benzene.

10. The compound of claim 1 which is 1-N-(α-phenyl-α-butyl-succinimido)-4-sulphonamido-benzene.

11. The compound of claim 1 which is 1-N-(α,α-diphenyl-succinimido)-4-sulphonamido-benzene.

12. The compound of claim 1 which is 1-N-[α-(p-nitrophenyl)-α-methyl-succinimido)-4-sulphonamido-benzene.

13. The compound of claim 1 which is 1-N-(α-phenyl-α-ethyl-succinimido)-4-sulphonamido-benzene.

No references cited.

HENRY R. JILES, Primary Examiner

C. M. S. JAISLE, Assistant Examiner

U.S. Cl. X.R.

260—239.7, 239.75, 239.8, 268 S, 293.71, 2565 R, 294.8 F, 304, 309, 326.3, 326.5 SF; 424—229, 250, 251, 263, 267, 273, 274